April 12, 1938.　　A. L. JACKSON　　2,114,078
GRAVEL CRUSHER AND DISTRIBUTOR
Filed Dec. 23, 1936　　3 Sheets-Sheet 2

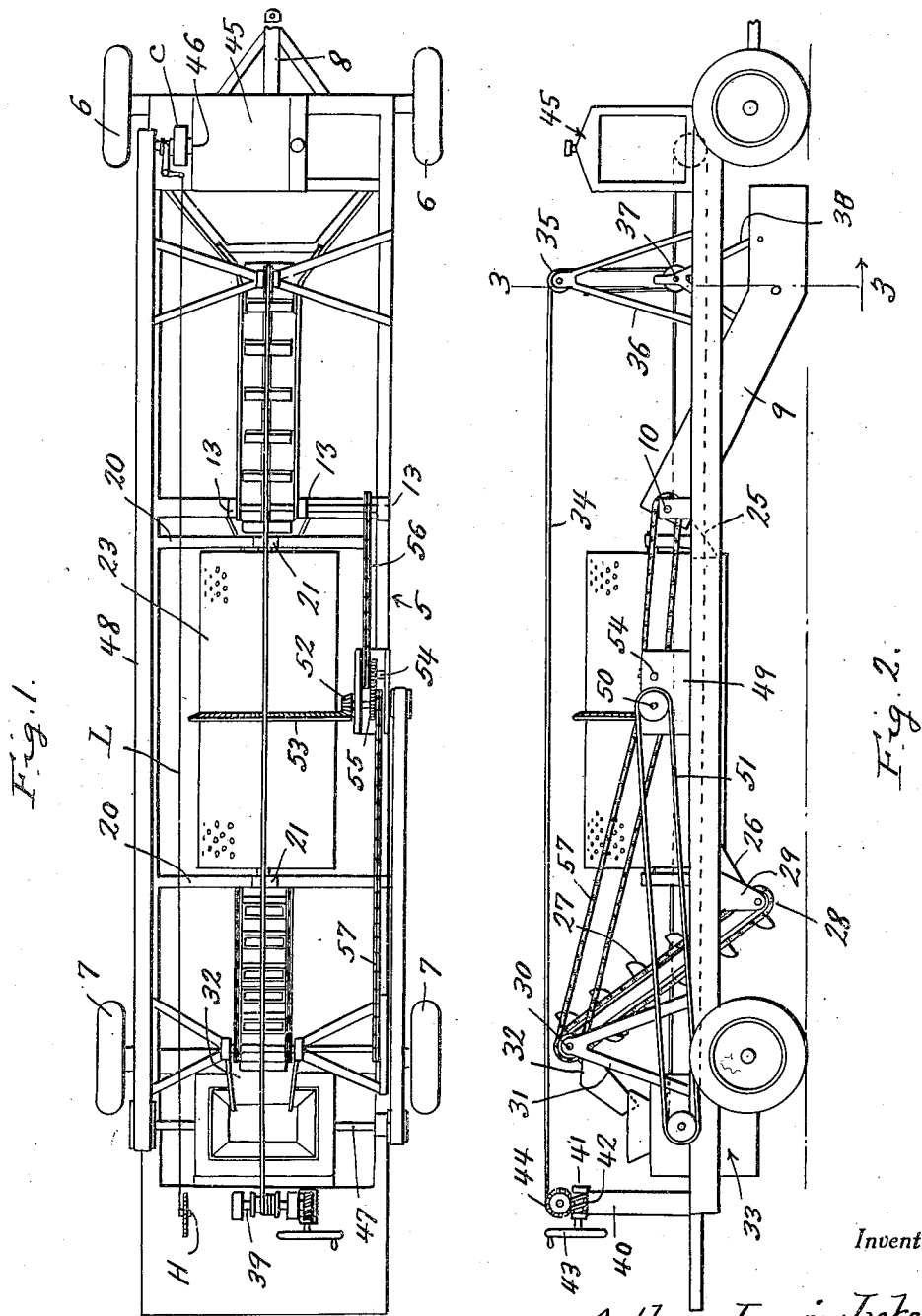

Inventor
Arthur Louis Jackson
By Clarence A. O'Brien
Hyman Berman
Attorneys

April 12, 1938. A. L. JACKSON 2,114,078
GRAVEL CRUSHER AND DISTRIBUTOR
Filed Dec. 23, 1936 3 Sheets-Sheet 3

Inventor
Arthur Louis Jackson

By Clarence A O'Brien
Hyman Berman
Attorneys

Patented Apr. 12, 1938

2,114,078

UNITED STATES PATENT OFFICE 2,114,078

GRAVEL CRUSHER AND DISTRIBUTOR

Arthur Louis Jackson, Kirby, Ark.

Application December 23, 1936, Serial No. 117,408

1 Claim. (Cl. 94—41)

This invention is a machine for use in gathering gravel from a road surface, crushing the gravel and then distributing the crushed gravel over the road.

An object of the present invention is to provide a machine of this character which may be used as a trailer and readily attached to a draft vehicle, and which will permit the gathering, crushing and redistribution of fine gravel over a road as the vehicle moves over the road.

The invention together with its objects and advantages will be best understood from a study of the following description taken in connection with the accompanying drawings wherein:—

Figure 1 is a top plan view of the machine.

Figure 2 is a side elevational view thereof.

Figure 3:
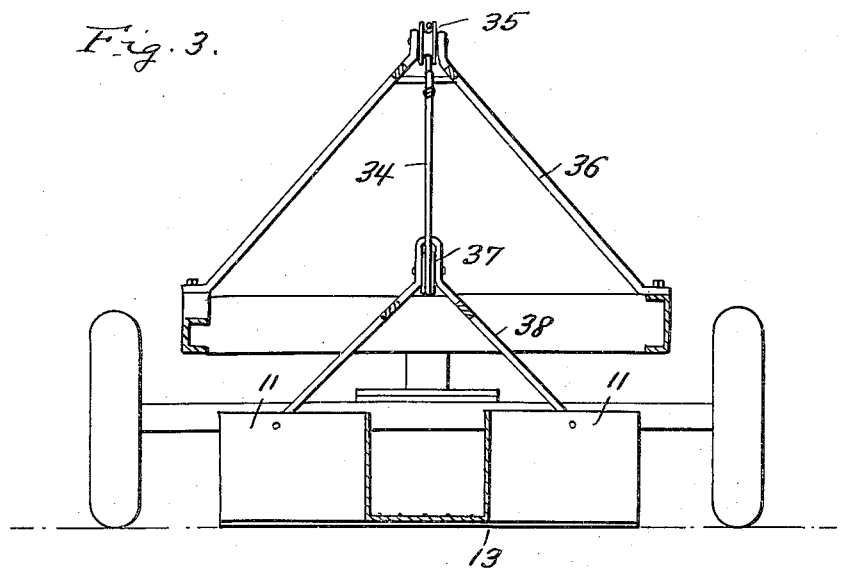
Figure 3 is a vertical sectional view taken substantially on the line 3—3 of Figure 2.

Referring to the drawings by reference numerals it will be seen that in the preferred embodiment thereof the machine, which is in the nature of a draft vehicle, comprises a frame 5 supported by front wheels 6 and rear wheels 7. At the front thereof the frame is provided with a draft tongue 8 through the medium of which the vehicle may be hitched to the rear of a suitable draft vehicle.

Figure 6:
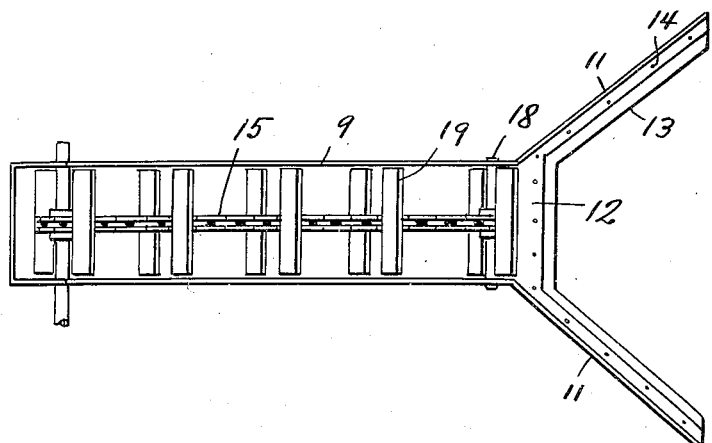

At the front of the vehicle there is provided a conveyor trough 9 which is pivotally supported by a shaft 10 journaled in suitable bearing brackets 13. At the lower or free end thereof the side walls of the trough 9 are extended laterally and forwardly as at 11 to provide the side flanges or walls of a scoop, the bottom of the scoop being formed by a continuous flange 12 that extends from the terminal of one wall extension 11 across the lower end of the chute 9 and to the free end of the other wall extension 11 as clearly shown in Figure 6.

The substantially V-shaped blade 13 is riveted or otherwise secured to the flange 12 as at 14.

Working in the trough 9 is an endless chain 15 that is trained over a sprocket 16 on the aforementioned shaft 10 and also trained over a sprocket 17 provided on a shaft 18 journaled between the side walls of the trough 9 at the lower end of the trough. Secured to the chain 15 at intervals are transverse scraper or propelling blades 19 which serve to conduct the gravel upwardly to the upper end of the trough.

Opposite side members of the frame 5 intermediate the ends of the frame are connected by cross bars 20 from which rise bearing standards 21.

Journaled in the bearing standards 21 are the ends of a shaft 22 that extends through a perforated drum or cylinder 23.

Figure 4:
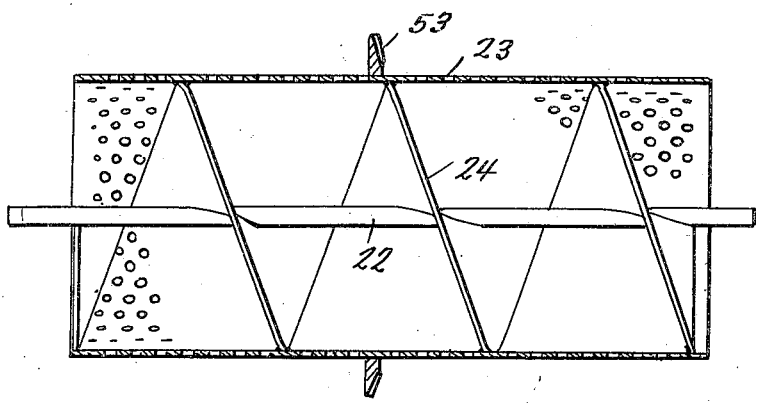
Figure 4 is a longitudinal sectional view through a perforated cylinder.
Figure 5:
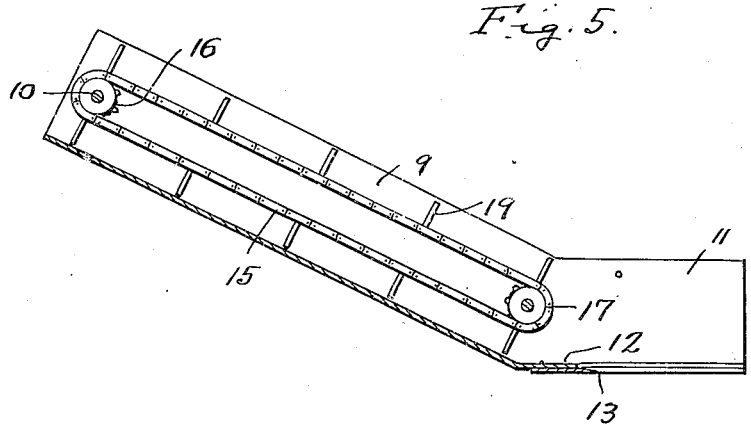
Figure 5 is a longitudinal sectional view through a scoop and conveyor assembly and Figure 6 is a top plan view of the scoop and conveyor assembly.

As shown in Figure 4 there is provided on the shaft 22 a spiral or screw conveyor 24, the vanes of which are welded or otherwise secured to the periphery of the drum 23 so that the shaft 22, vanes 24 and drum 23 rotate as a unit.

Extending from a point adjacent the upper end of the trough 9 to the drum or cylinder 23 is an inclined chute 25 which serves to direct the gravel carried upwardly by the conveyor into the cylinder or drum 23.

Suitably mounted on the frame 5 at the end of the drum remote from the chute 9 is a chute 26 through which the large gravel passed through the drum or cylinder 23 passes to be received in the ascending buckets of an inclined bucket equipped endless conveyor 27 suitably mounted, as shown, adjacent the rear end of the machine. In this connection it will be noted that the lower shaft 28 of the conveyor 27 is journaled in brackets 29 suitably mounted on the frame 5 while the shaft 30 at the upper end of the conveyor 27 is suitably journaled in bearing standards 31 provided therefor. Also suitably mounted at the upper ends of the standards 31 is a short chute 32 through the medium of which the large gravel from the conveyor 27 is directed into a conventional crusher device mounted at the rear of the machine and indicated generally by the reference numeral 33.

From the description of the invention thus far it will be seen that as the machine is drawn over the road surface the gravel is gathered by the scoop structure at the lower end of the chute 9 and is directed towards the chute to be carried upwardly through the medium of the conveyor working in the chute. From the upper end of the chute 9 the gravel, large and small, passes on to the chute 25 to be directed thereby into the rotating cylinder 23. As the cylinder 23 rotates the gravel through the medium of the screw conveyor 24 is caused to move toward the opposite end of the cylinder, the smaller particles of gravel sifting through the perforations in the cylinder 23 and the larger particles of gravel continuing through the cylinder to pass therefrom on to the chute 26 and into the ascending buckets of the conveyor 27. Through the medium of the conveyor 27 and the chute 32 these larger pieces of gravel are conducted to the crusher 33 discharging at the bottom of the crusher in small particles on to the ground.

The chute 9 is suspended at the forward end thereof through the medium of a cable 34 which at one end is trained over a pulley 35 mounted between suitable bearing standards 36 rising from opposite sides of the frame 5. At said one end cable 34 is looped about a pulley 37 journaled in a suitable bracket structure 38 provided at the forward end of the chute 9.

The cable 34 extends rearwardly and is windable on a winch or drum 39 supported by suitable standards 40.

On one of the standards 40 there is provided a bracket 41 in which is journaled a worm 42 the shaft of which is equipped with a hand wheel 43. The worm 42 is in mesh with a worm wheel 44. It will thus be seen that by turning the handle 43 drive will be transmitted to the drum 39 for paying out the cable 34 when it is desired to lower the scoop equipped end of the chute 9, or for winding the cable 34 on the drum 39 when it is desired to raise the scoop equipped end of the chute 9.

Also mounted transversely of the frame 5 at the forward end thereof is a prime mover 45 which latter is in the nature of an internal combustion engine.

The shaft 46 of the engine 45 is connected with the shaft 47 of the crusher 33 through the medium of a belt and pulley drive means 48 so that, as is apparent, the crusher 33 is driven from the prime mover 45.

Also mounted on one side of the frame 5 is a suitable bracket structure 49 in which is journaled a shaft 50 that is driven from the shaft of the crusher 33 through the medium of a belt and pulley drive means 51.

Shaft 50 is also provided with a bevelled gear 52 that is in mesh with a circular bevelled gear 53 provided on the periphery of the drum or cylinder 23. Thus it will be seen that the cylinder and drum 23 is driven also from the shaft 47.

Also journaled in the bracket 49 is a shaft 54 that is driven from shaft 50 through the medium of gearing 55. Shaft 54 has a chain and sprocket connection 56 with shaft 10 for driving the conveyor chain 15 while shaft 49 has a chain and sprocket connection 57 with the upper shaft 50. Thus it will be seen that all driven parts are driven from the prime mover 45 to work in unison as the vehicle moves over the ground.

For controlling the drive from the engine 45 to the belt and pulley mechanism 48 there is provided a suitable clutch mechanism, C, connected by link means, L, with a rearwardly disposed hand lever, H, as shown best in Figure 1.

The utility and advantages of the invention will be appreciated from the following:—This improved gravel crusher and distributor is particularly designed for use on roads surfaced with gravel found mixed in earth with clay. In the surfacing of these roads, hills or beds of gravel are excavated and the gravel as found mixed with clay is taken and spread over the road surface. These round shaped gravel vary in size from that of a pea up to that of a baseball or even larger. It is expensive and impractical to screen this gravel before it is put on the road as the percentage of over-size gravel is small in comparison with the quantity to be handled. In addition this screening would separate the clay from the gravel before it could be placed on the road surface.

In the maintenance of the road, road graders are run over the road surface to smooth it down and redistribute the gravel and clay whipped out by cars and trucks. When the grader is run over the surface, a surplus of the material is rolled up in a row on either side of the road bed or in the middle. Here is shown up the over-sized gravel which is injurious on vehicular wheel tires. Heretofore, men have been employed to go over the road with rakes and take out the over-sized gravel, pitching it out by hand, an expensive and laborious process as well as a slow one.

With my invention the machine runs astride one of these rows, scoops up the gravel, passing the gravel to the screen cylinder from which the small sized gravel falls through the perforations in the cylinder and the larger or oversized gravel passes from the cylinder into the crusher which crushes it to a size uniform with that which fell through the screen.

It is thought that a clear understanding of the construction, utility and advantages of an invention of this character will be had without a more detailed description.

Having thus described the invention, what is claimed as new is:—

In a machine of the character described, a wheel supported frame, a perforated cylinder rotatably mounted on said frame intermediate the ends of the frame, a chute mounted in the frame at the forward end of the latter, a scoop on one end of the chute for directing gravel toward and into the chute, an endless conveyor in said chute for conveying the gravel to said cylinder, means within the cylinder for conducting the gravel therein through the cylinder, an inclined bucket conveyor mounted in the frame adjacent the rear end of the latter for receiving the gravel discharging from the rear end of the cylinder, and a crusher mechanism mounted on the frame at the rear end thereof to receive the gravel from the bucket conveyor for crushing the gravel for redistribution in a crushed state on to the ground, a prime mover mounted on the forward end of said frame, and driving mechanism at one side of the frame connecting said prime mover with the crusher for driving the latter, said means including a remote controlled clutch device for controlling the transmission of drive from the prime mover to the crusher, driving mechanism on the opposite side of the frame connecting the crusher with said cylinder for revolving the latter and including a driven shaft intermediate the ends of the frame, said shaft being operatively connected at one end to said crusher at the opposite end to said cylinder, and driving mechanism extending forwardly and rearwardly from said driven shaft and connecting said driven shaft with the respective conveyors for driving said conveyors from said shaft.

ARTHUR LOUIS JACKSON.